United States Patent [19]
Connell et al.

[11] 3,827,710
[45] Aug. 6, 1974

[54] VEHICLE STEERING COLUMN INSTALLATION

[75] Inventors: Lehman J. Connell, Frankenmuth; Lyle H. Durkee, Hemlock, both of Mich.

[73] Assignee: General Motors Corporation, Detroit, Mich.

[22] Filed: June 25, 1973

[21] Appl. No.: 373,162

[52] U.S. Cl................... 280/87 R, 74/492, 180/78
[51] Int. Cl............................................... B62d 1/18
[58] Field of Search........... 180/78; 280/87 R, 87 A; 74/492, 493; 248/226 R, 226 D

[56] References Cited
UNITED STATES PATENTS

| | | | |
|---|---|---|---|
| 3,170,711 | 2/1965 | Dunifon et al. | 280/87 A |
| 3,300,229 | 1/1967 | Kishline | 280/87 R |
| 3,724,286 | 4/1973 | Kitzner et al. | 74/492 |

Primary Examiner—Duane A. Reger
Assistant Examiner—Stuart M. Goldstein
Attorney, Agent, or Firm—Saul Schwartz

[57] ABSTRACT

A vehicle steering column installation including a collapsible steering column assembly and an improved arrangement for supporting the latter on the body portion of the vehicle, the improved supporting arrangement including a collar on a lower mast jacket section of the column assembly engaging a rigid bar on the body portion to support the column assembly on the body portion for pivotal movement to a fully installed position, a keeper on the upper mast jacket section defining a pair of integral spring biased retaining fingers, and a striker on an upper mast jacket section of the column assembly defining a pair of bearing surfaces. The striker engages the keeper during pivotal movement of the column assembly toward the fully installed position to separate the retaining fingers which automatically engage the bearing surfaces when the column assembly achieves the fully installed position thereby to retain the column assembly in the fully installed position.

4 Claims, 8 Drawing Figures

VEHICLE STEERING COLUMN INSTALLATION

This invention relates generally to vehicle steering column installations and more particularly to the attachment of the steering column assembly to the body of the vehicle.

Typically, a steering column assembly for a modern automobile is an elongated structure having a substantial mass concentration at the hub or steering wheel end and a pair of outer tube or mast jacket sections adapted for relative telescopic or longitudinal collapse in an energy absorbing mode. To adequately support the column assembly, and particularly the hub end, on the body of the vehicle, the lower end of one of the mast jacket sections is usually anchroed to the fire wall or bulkhead portion of the body while the other of the mast jacket sections is attached to reinforcing members behind the instrument panel through releasable fasteners which permit collapse of the column assembly under impact but which rigidly support the hub end of the column assembly during normal operation. As might be expected, installing the column assembly during assembly of the vehicle is a time consuming and, therefore, expensive operation. A vehicle steering column installation according to this invention incorporates an improved mounting arrangement which facilitates rapid and accurate placement of the column assembly in the vehicle body.

The primary feature, then, of this invention is that it provides an improved vehicle steering column installation. Another feature of this invention is that it provides an improved vehicle steering column installation wherein the steering column assembly is automatically retained in a fully installed and properly aligned position without conventional fasteners. Yet another feature of this invention resides in the provision in the improved steering column installation of a striker on one of the column assembly and the body and a keeper on the other, the keeper defining a plurality of integral, self-biased retaining fingers which automatically lock behind corresponding bearing surfaces on the striker when the column assembly achieves a fully installed position. A further feature of this invention resides in the provision in the improved steering column installation of a striker having open sided bearing surfaces which permit escape of the retaining fingers during telescopic collapse of the column assembly so that such collapse is unimpeded. A still further feature of this invention resides in the provision in the improved steering column installation of secondary springs between the striker and the keeper which resiliently urge the striker bearing surfaces into engagement on the keeper retaining fingers so that looseness or play between the keeper and the striker is eliminated. These and other features of this invention will be readily apparent from the following specification and from the drawings wherein:

FIG. 1 is a fragmentary perspective view of the forward interior section of the body portion of an automobile type vehicle incorporating an improved steering column installation according to this invention and showing the steering column assembly in a semi-installed position;

Figure 2:
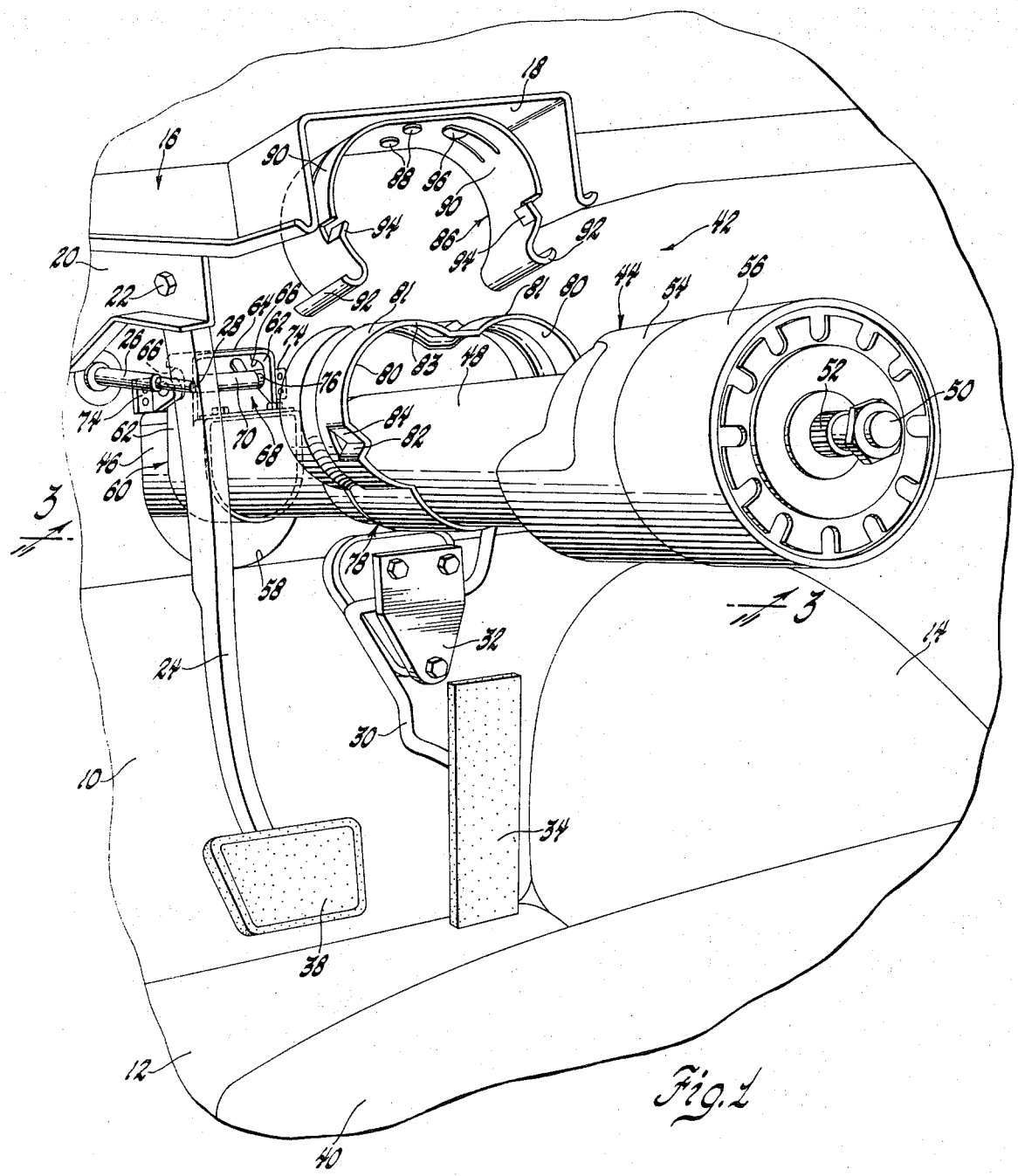
FIG. 2 is similar to FIG. 1 but showing the steering column assembly in a fully installed position.
Figure 2:
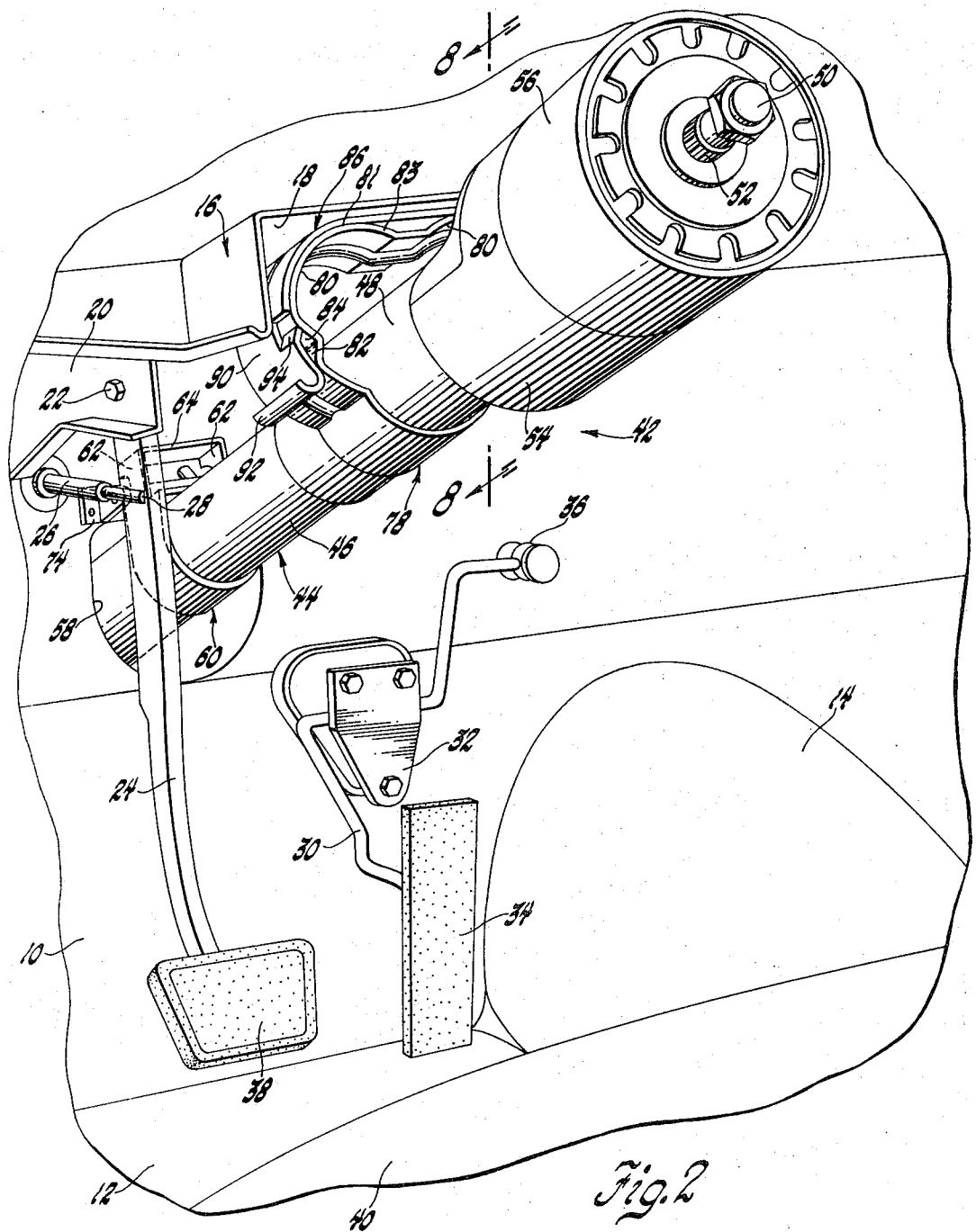

Referring now to the drawings, FIGS. 1 and 2 depict the forward section of the interior of the body portion of an automobile type vehicle, the body portion being defined at the forward end by a fire wall or bulkhead 10 which merges with a floor panel 12 including a transmission tunnel 14. The fire wall 10 projects upwardly from the floor 12 and has rigidly attached thereto a brace 16 defining a longitudinally extending enclosure 18 in the form of an inverted channel.

A brace 20 projects rigidly from the fire wall and pivotally supports at 22 a brake pedal 24. A push rod 26 projects through the fire wall and has one end, not shown, connected to a conventional brake master cylinder and the other end pivotally connected at 28 to the brake pedal 24. An accelerator control bellcrank 30 is pivotally supported on the fire wall by a bracket 32 and has a conventional pedal pad 34 disposed in one end thereof, the other end being connected at 36, FIG. 2, to one end of a throttle control cable, not shown. The pedal pad 34 and a pad 38 disposed at the end of the brake pedal 24 are adapted for foot actuation by an operator positioned on a seat 40, the seat being mounted on the floor 12 through a conventional adjuster arrangement, not shown. A steering column installation according to this invention and designated generally 42 is disposed between the seat 40 and the fire wall 10 and represents a portion of an otherwise conventional vehicle steering system, not shown, including a manual or power assisted steering gear, appropriate linkage, and the like.

Referring particularly now to FIGS. 1 through 4, the steering column installation 42 includes a generally conventional collapsible steering column assembly 44, the column assembly including a tubular lower mast jacket section 46, a tubular upper mast jacket section 48, and a steering shaft 50. The steering shaft is rotatably journaled in the mast jacket sections and functions to transfer steering torque from a steering handwheel, not shown, disposed on a knurled end portion 52 of the steering shaft to a conventional flexible coupling, not shown, connected to the input shaft of the steering gear. The upper mast jacket section is adapted for longitudinal bodily movement or telescopic collapse relative to the lower mast jacket section in an energy absorbing mode when the column assembly is subjected to the compressive impact. The steering shaft 50, of course, is also conventionally adapted for longitudinal collapse. At its outboard end adjacent the knurled end portion 52, the column assembly 44 includes a hub portion 54 and a rotatable shift bowl 56. The hub portion houses the steering shaft bearings, the ignition and steering shaft lock arrangement, the directional signal switch assembly, and the like, while the shift bowl 56 supports the transmission range selector lever, not shown.

As seen best in FIGS. 1 through 5, the lower end of the lower mast jacket section 46 projects through an aperture 58 in the fire wall 10, the space between the edges of the aperture 58 and the mast jacket section 46 being closed and sealed by a flexible boot, not shown. A collar 60 surrounds and is rigidly attached to the lower mast jacket section 46 adjacent the fire wall 10 by conventional means, as by welding, and includes a pair of laterally spaced legs 62 interconnected by a horizontal web 64. Each leg 62 includes a notch 66 opening toward the fire wall. A leaf spring 68 having an arcuate portion 70 is rigidly attached to the collar 60 by a pair of rivets 72 and is self-biased in a counterclockwise direction, FIG. 5.

Referring again to FIGS. 1 through 5, a pair of support lugs 74 are rigidly attached to the fire wall on opposite sides of the aperture 58 and rigidly support in a generally horizontal attitude a cross bar 76. The cross bar is adapted for reception in the notches 66 and is retained therein by the leaf spring 68 which engages the cross bar at the arcuate portion 70, FIGS. 4 and 5. Accordingly, the cross bar 76 and the collar 60 cooperate in supporting the steering column assembly 44 on the body portion of the vehicle for pivotal movement between a semi-installed position, shown in FIG. 1 and in solid lines in FIG. 3, and a fully installed position, shown in FIG. 2 and in broken lines in FIG. 3, in a longitudinally oriented vertical plane. Further, the cross bar 76 and the collar 60 cooperate in preventing bodily movement of the lower mast jacket section in the direction of relative telescopic collapse of the upper mast jacket section or, in other words, toward the fire wall 10.

As seen best in FIGS. 1, 2, 3 and 6 through 8, a striker 78 is rigidly attached to the upper mast jacket section 48 by conventional means, not shown, and defines a pair of symmetrical loop sections 80. Each loop section defines a generally cylindrical outer surface 81 and includes an indentation 82 adjacent a marginal edge 83 defining a flat bearing surface 84. The bearing surfaces extend in parallel relation to the longitudinal axis of the steering column assembly and are disposed symmetrically on opposite sides of the vertical plane of movement of the steering column assembly.

Figure 7:
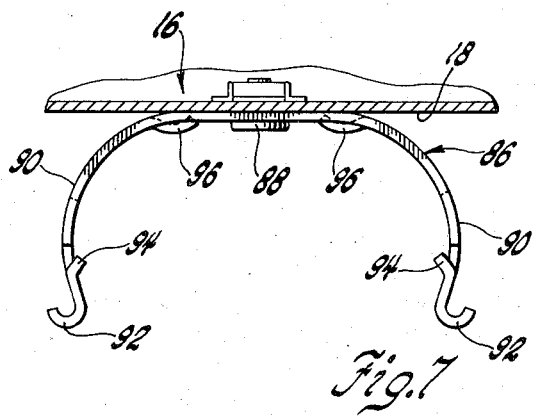
FIG. 7 is a sectional view taken generally along the plane indicated by lines 7—7 in FIG. 3.
Figure 8:
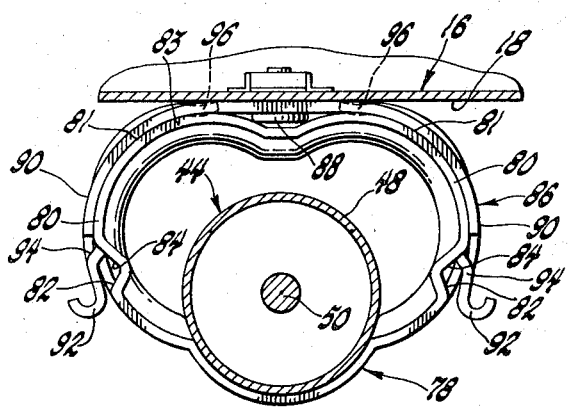
FIG. 8 is a sectional view taken generally along the plane indicated by lines 8—8 in FIG. 2.

As seen best in FIGS. 1, 7 and 8, a keeper 86 is centrally disposed within the enclosure 18 defined by the brace 16 and is rigidly attached to the latter by a pair of conventional fasteners 88. The keeper 86 defines a pair of laterally spaced depending spring arms 90 each having a curled end 92, an integral retaining finger 94, and a secondary spring finger 96. The spring arms 90 exhibit a curvature generally complementary to the curvature of the cylindrical surfaces 81 on the striker 78 and are self-biased toward each other to a free position, FIG. 7, wherein the spacing between the curled ends 92 is insufficient to permit free vertical passage of the striker into the enclosure 18. Accordingly, pivotal movement of the steering column assembly from the semi-installed position toward the fully installed position effects engagement between the curled ends 92 and corresponding ones of the cylindrical surfaces 81, the latter thereafter functioning cams for separating the spring arms 90 to permit continued upward movement of the steering column assembly. The spring arms 90, of course, are continually biased toward the free position so that when the steering column assembly achieves the fully installed position, FIGS. 2 and 8, the retaining fingers 94 are projected into the indentations 82 in the striker and against the bearing surfaces 84 thereby to automatically retain the steering column assembly in the fully installed position. Simultaneously, the portions of the spring arms 90 above the retaining fingers 94 engage portions of the cylindrical surfaces 81 to laterally rigidify the column assembly while the secondary spring fingers 96 engage the uppermost sections of the cylindrical surfaces 81 to urge the bearing surfaces positively into engagement on the retaining fingers.

Figure 3:
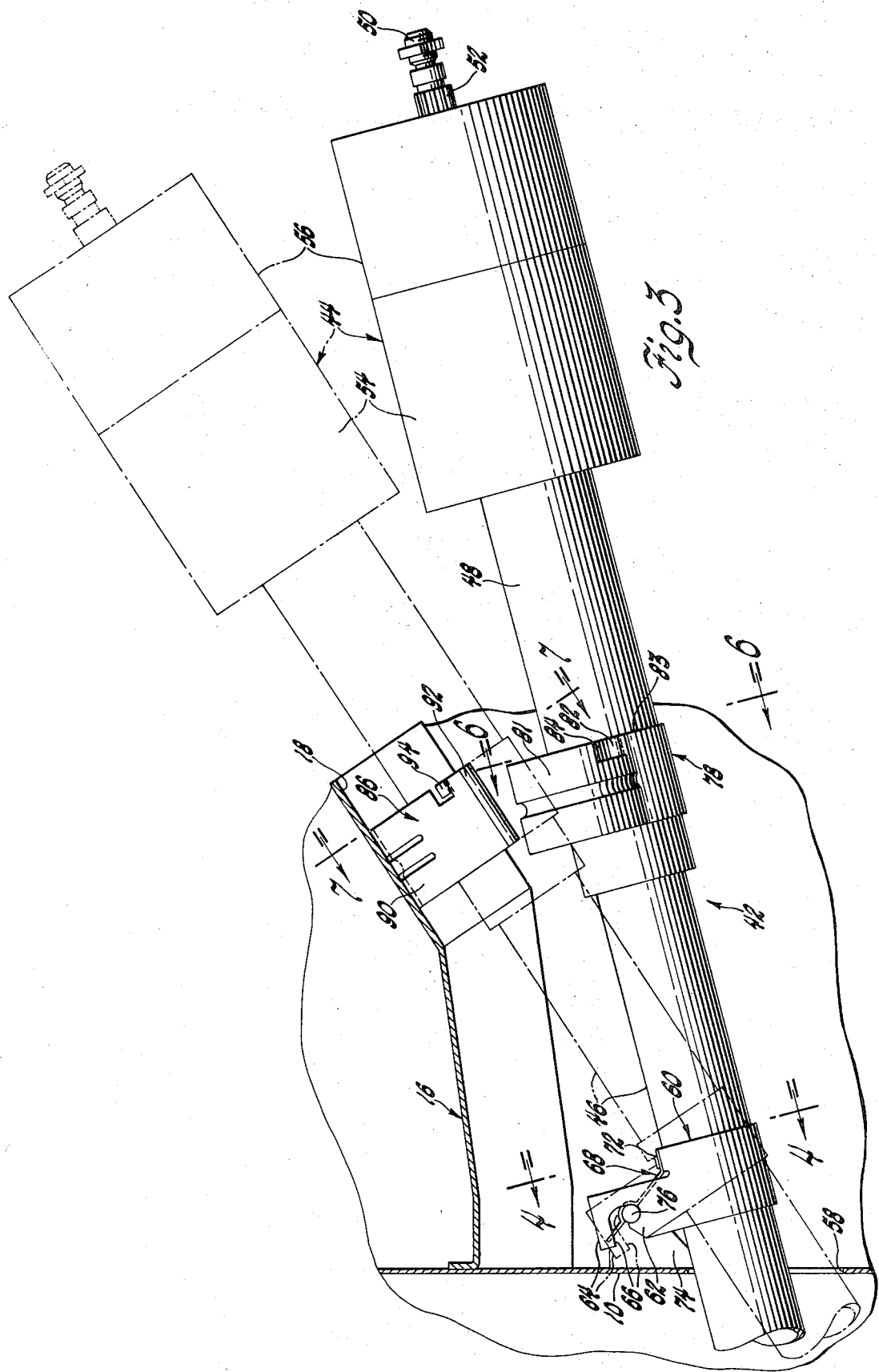
FIG. 3 is a partially broken away view taken generally along the plane indicated by lines 3—3 in FIG. 1 and showing the steering column assembly in the semi-installed and the fully installed positions in solid and broken lines respectively.
Figure 4:
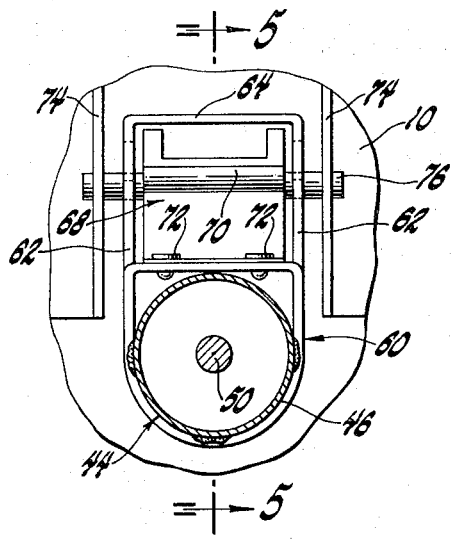
FIG. 4 is a sectional view taken generally along the plane indicated by lines 4—4 in FIG. 3.
Figure 6:
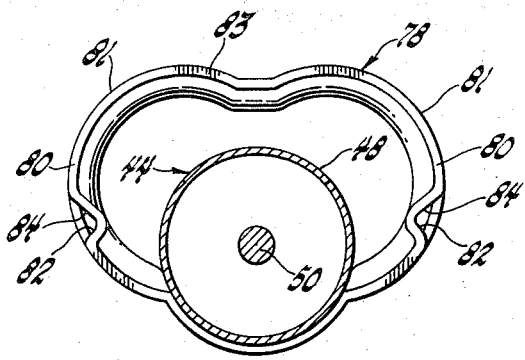
FIG. 6 is a sectional view taken generally along the plane indicated by lines 6—6 in FIG. 3.
Figure 5:
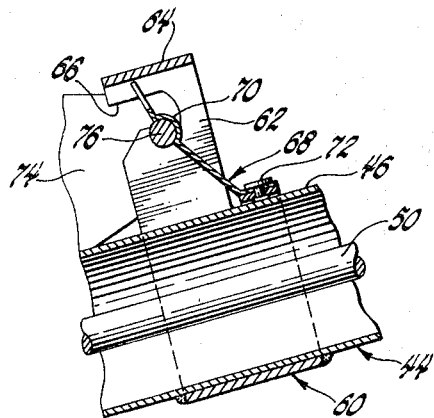
FIG. 5 is a sectional view taken generally along the plane indicated by lines 5—5 in FIG. 4.

Referring particularly now to FIGS. 1, 2 and 3 and describing a typical assembly sequence for the steering column installation according to this invention, the steering column assembly 44 is first projected through the aperture 58 in the fire wall until the cross bar 76 enters the notches 66 in the collar 60. Thereafter continued forward bodily movement of the steering column assembly toward the fire wall effects latching engagement between the cross bar, the notches 66, and the leaf spring 68 so that the column assembly is supported on the vehicle body for pivotal movement as described hereinbefore. Thereafter, the steering column assembly is pivoted upwardly from the semi-installed position to the fully installed position, FIG. 3, during which movement the cylindrical surfaces 81 on the striker engage the curled ends 92 on the keeper 86 to separate the spring arms 90 for permitting continued upward pivotal movement of the steering column assembly. The bias inherent in the spring arms 90 provides a self-centering feature which maintains the steering column assembly centered in the longitudinal plane of pivotal movement.

As the steering column assembly achieves the fully installed position, the retaining fingers 94 are urged by the spring arms 90 into the indentations 82 on the striker so that the retaining fingers 94 engage the bearing surfaces 84 on the striker to automatically retain the steering column assembly in the fully installed position. Simultaneously, the secondary spring fingers 96 engage the cylindrical surfaces 81 and impose a generally downwardly directed force on the striker 78. The downwardly directed force urges the bearing surfaces 84 against the retaining fingers 94 thereby to eliminate any looseness or play between the striker and the keeper. Accordingly, the steering column assembly is automatically retained in the fully installed position centered with respect to the longitudinal plane of movement described hereinbefore.

During normal vehicle operation, the collar 60, the cross bar 76, the keeper 86 and the striker 78 cooperate in supporting the steering column assembly on the vehicle body for conventional operation. In the event of a substantial forwardly directed impact on the steering wheel end of the steering column assembly, relative telescopic collapse is initiated between the lower mast jacket section and the upper mast jacket section. Bodily movement of the lower mast jacket section 46 is, of course, prevented by the cross bar 76 so that the upper mast jacket section moves forward. Since the bearing surfaces 84 extends in a clear path from the marginal edge 83 of the striker, no obstruction exists to relative sliding movement between the retaining fingers 94 and the bearing surfaces. Accordingly, the striker slides forwardly within and relative to the keeper 86 with the retaining fingers 94 merely sliding past the marginal edge 83 and off of the bearing surfaces 84. Simultaneously, the secondary spring fingers 96 slide relative to the cylindrical surfaces 81 until each clears the marginal edge 83 of the striker. As an additional feature, the keeper 86 functions as a guide for the steering column assembly during telescopic collapse so that the latter is maintained at a predetermined attitude effecting optimum energy absorbing performance.

In the event that a rearwardly directed impact is received at the lower end of the lower mast jacket section 46, the inboard edges of the indentations 82 engage corresponding edges of the retaining fingers 94 to prevent rearward bodily movement of the upper mast jacket section. Accordingly, energy absorbing collapse in the reverse direction is effected without rearward movement of the upper mast jacket section.

Having thus described the invention what is claimed is:

1. In a vehicle having a body portion, the combination comprising, a steering column assembly, means supporting said steering column assembly on said body portion for pivotal movement in a vertically oriented longitudinal plane between a semi-installed position and a fully installed position, a striker rigidly supported on one of said steering column assembly and said body portion defining a pair of laterally spaced bearing surfaces disposed symmetrically with respect to said longitudinal plane, a keeper defining a pair of integral retaining fingers spring biased toward a free position, means rigidly supporting said keeper on the other of said steering column assembly and said body portion, and cam means on said striker engageable on said keeper for separating said retaining fingers in response to pivotal movement of said steering column assembly toward the fully installed position thereby to permit achievement of the fully installed position, said retaining fingers automatically engaging corresponding ones of said bearing surfaces in the fully installed position of said steering column assembly for retaining the latter in the fully installed position.

2. In a vehicle including a body portion, the combination comprising, a collapsible steering column assembly including a lower mast jacket section and an upper mast jacket section disposed on said lower section for telescopic collapse in an energy absorbing mode, means supporting one end of said lower mast jacket section on said body portion for pivotal movement in a vertically oriented longitudinal plane between a semi-installed position and a fully installed position, means on said body portion and on said lower mast jacket section adapted to prevent longitudinal bodily shiftable movement of said lower mast jacket section in the direction corresponding to relative telescopic collapse of said upper mast jacket section, a striker rigidly supported on one of said upper mast jacket section and said body portion, means on said striker defining a pair of laterally spaced bearing surfaces disposed symmetrically with respect to said longitudinal plane and extending generally parallel to the longitudinal axis of said steering column assembly in the fully installed position thereof from one marginal edge of said striker in the direction of relative telescopic collapse of said upper mast jacket section, a keeper defining a pair of integral retaining fingers spring biased toward a free position, means rigidly supporting said keeper on the other of said upper mast jacket section and said body portion, and cam means on said striker engageable on said keeper for separating said retaining fingers in response to pivotal movement of said steering column assembly toward the fully installed position thereby to permit achievement of the fully installed position, said retaining fingers automatically engaging corresponding ones of said bearing surfaces in the fully installed position of said steering column assembly for retaining the latter in the fully installed position and being slidable relative to said bearing surfaces for permitting relative telescoping collapse of said upper mast jacket section.

3. The combination recited in claim 2 further including secondary spring means disposed between said keeper and said striker for urging said striker bearing surfaces into engagement on said retaining fingers thereby to eliminate looseness between said keeper and said striker.

4. In a vehicle including a body portion, the combination comprising, a collapsible steering column assembly including a lower mast jacket section and an upper mast jacket section disposed on said lower mast jacket section for telescopic collapse in an energy absorbing mode, a rigid bar disposed on said body portion in a generally transverse horizontal attitude, a collar disposed on said lower mast jacket section defining a mouth portion for rotatably receiving said rigid bar thereby to support said steering column assembly on said body portion for pivotal movement in a vertically oriented longitudinal plane between a semi-installed position and a fully installed position while preventing bodily movement of said lower mast jacket section in the direction of relative telescopic collapse of said upper mast jacket section, a striker rigidly supported on said upper mast jacket section, means on said striker defining a pair of laterally spaced bearing surfaces disposed symmetrically with respect to said longitudinal plane and extending generally parallel to the longitudinal axis of said steering column assembly from one marginal edge of said striker in the direction of relative telescopic collapse of said upper mast jacket section, a keeper defining a pair of integral retaining fingers spring biased toward a free position and a pair of integral secondary spring fingers, means rigidly supporting said keeper on said body portion, and cam means on said striker engageable on said keeper for separating said retaining fingers in response to pivotal movement of said steering column assembly toward the fully installed position thereby to permit achievement of the fully installed position, said retaining fingers automatically engaging corresponding ones of said bearing surfaces in the fully installed position of said steering column assembly for retaining the latter in the fully installed position and being slidable relative to said bearing surfaces for permitting relative telescopic collapse of said upper mast jacket section, said secondary spring fingers engaging said striker and resiliently urging said bearing surfaces into engagement on said retaining fingers thereby to eliminate looseness between said keeper and said striker.

* * * * *